United States Patent Office 3,748,151
Patented July 24, 1973

3,748,151
FOOD PRODUCT CONTAINING A NOVEL CONVERTING STARCH
Chester D. Szymanski, Martinsville, N.J., assignor to National Starch and Chemical Corporation, New York, N.Y.
No Drawing. Original application Oct. 14, 1969, Ser. No. 866,386, now Patent No. 3,635,741. Divided and this application Oct. 18, 1971, Ser. No. 190,412
Int. Cl. C13l 1/08
U.S. Cl. 99—144          6 Claims

ABSTRACT OF THE DISCLOSURE

A novel converting starch product comprising a starch base which is admixed with a modifying agent, aqueous dispersions of which product display a high viscosity when first gelatinized but upon being cooked at retort temperatures are converted resulting in a dispersion exhibiting a substantially reduced viscosity. The modifying agent is ascorbic acid, araboascorbic acid or dihydroxymaleic acid. Such starch products find a particular use in the commercial preparation of foods.

---

This is a division of application Ser. No. 866,386, filed Oct. 14, 1969, now U.S. Pat. No. 3,635,741.

BRIEF SUMMARY OF THE INVENTION

This invention relates to a novel converting starch and to compositions which contain such a converting starch. As used in this invention, the term "a converting starch" denotes a starch which has been admixed with a specified modifying agent so that when an aqueous dispersion of the starch product reaches its gelation temperature, it displays a normal, high viscosity, and which on being cooked at retort temperatures, the starch is converted, i.e. degraded, thereby reducing its molecular weight, as manifested by the substantially reduced viscosity of the resultant dispersion, as compared to a comparable dispersion of the identical starch which has not undergone treatment with the modifying agent.

BACKGROUND OF THE INVENTION

The degradation or depolymerization of starch can be effected by means of a number of known methods which include treatment of starch with inorganic acids, or enzymes, or by exposing it to a combination of elevated temperatures and high sheer action. Thus, the treatment of dry starches with inorganic acids, such as hydrochloric or sulfuric acid, produces the so-called fluidity or thin-boiling starches, or, the acid conversion can be carried out on aqueous starch dispersions in the manner utilized for the production of syrups. Ordinarily, relatively high concentrations of acid are needed in such conversion procedures in order to maintain the pH of the system at levels of 2 or below. The conversion of starches by means of enzymes is carried out by the treating of a dispersed starch system containing hydrolyzing enzymes such, for example, as the alpha-amylase preparations derived from *Bacillus subtilis*. While significant degradation is quickly attained in such starch systems, this method is economically unattractive because of the high cost of the required enzymes. The conversion of starches by applying heat and high shear action is also carried out on aqueous starch dispersions, preferably in the presence of catalysts such as hydrogen peroxide and copper sulfate. In variations of the latter process, the starch may, if desired, be pretreated with an oxidizing agent in order to weaken the granule and hasten dispersion. However, these thermal conversion procedures are relatively inefficient and time-consuming.

Thus, although it is seen that there are a number of procedures available for the conversion of starch, it is apparent that they all suffer from various disadvantages. Furthermore, none of the conventional procedures results in dispersions which are characterized by their ability to provide a normally high viscosity product upon heating to the gelatinization temperature of the particular starch together with the ability to provide a much thinner product when the dispersion is heated to retort temperatures.

Accordingly, it is the object of this invention to provide a converting starch product, the conversion of which will take place on cooking of its aqueous dispersions at retort temperatures.

It is another object of this invention to provide a starch product whose aqueous dispersions initially upon being gelatinized will display a normal, high viscosity level but which upon subsequent cooking at retort temperatures display a substantially reduced viscosity.

A further object of the present invention is to provide food compositions comprising various food base ingredients in admixture with said starch product.

Other objects of the present invention will become apparent from the disclosure which follows.

TECHNICAL DISCLOSURE OF THE INVENTION

I have found that the admixture of starch with at least about 0.2%, by weight, of a modifying agent selected from the group consisting of ascorbic acid, araboascorbic acid and dihydroxymaleic acid leads to the production of a converting starch which fulfills the above stated objects of this invention. The conversion of these starches takes place on the cooking of an aqueous dispersion of the starch ordinarily at retort temperatures. With certain of the converting starches, temperatures which are commonly employed in cooking starch dispersions are sufficient: these temperatures being, of course, in all cases, higher than the normal gelatinization temperature of starch. As used in this invention, the term "retort temperatures" means temperatures of about 250° F. and pressures of about 15 p.s.i.

The novel converting starch of the present invention is characterized by a number of unusual and highly desirable features.

One such feature of this starch is that it may be stored in dry form, prior to use, for extended periods without any danger of its undergoing a premature degradation. Thus, it is only upon cooking under the specified conditions that the desired degradation of the converting starch of this invention will take place.

Another feature of the novel converting starch of this invention is that its conversion can be carried out at pH levels ranging from about 3 to 9, with optimum results being attained at levels in the range of 5.5 to 6.5. The latter feature is particularly advantageous in using these converting starches for the commercial preparation of food products inasmuch as such foods are, ordinarily, retorted, i.e. pressure cooked, at approximately neutral pH levels.

It is to be noted that optimum conversions are attained with starches which contain the selected modifying agent in the range of from about 0.4 to 3%, as based on the weight of the starch base, although higher concentrations of the modifying agent may be used if desired. Use of such higher concentrations of the modifying agent are uneconomical however, and are ordinarily not necessary.

The starch base which may be used in preparing these novel converting starches may be derived from any of the usual sources, including corn, wheat, potato, tapioca, waxy maize, sago, rice and the like. The degradation resulting from the use of the modifying agents of this invention will be most apparent in the so-called "heavy boiling" starches, such as corn starch, which contain a substantial proportion of amylose. However, all types of starches can be used and are capable of being converted by means of the above-specified modifying agents. Mixtures of any desired starch bases may also be utilized.

Moreover, the selected starch base may be used in its original, raw, unmodified form, or it may first be treated in any desired manner, as for example, by being crosslinked, esterified or etherified.

In order to prepare the novel converting starches of this invention it is necessary only to admix the modifying agent, preferably in finely divided form, with the selected starch base. The resulting homogeneous mixture may then immediately be put into the form of an aqueous dispersion or it may be stored in dry form for future use. The conversion or degradation of these starches involves their dispersion in water, preferably in a concentration of from about 2 to 30%, by weight, and the subsequent cooking of the resulting dispersion. All of the novel starch products of this invention may be converted by the cooking of their aqueous dispersions at retort temperatures for a period of from about 10 to 40 minutes. While the use of retort temperatures has been found to be most practical and convenient, it is to be noted that the conversion of these starches may also be effected by the pressure-cooking of their dispersions to temperatures ranging from about 220 to 350° F. for a period of from about 1 to 45 minutes, since there is a time-temperature relationship which will be apparent to those skilled in the art. It is likewise to be noted that with the converting starches which are prepared using dihydroxymaleic acid, a simple cooking procedure utilizing temperatures of from about 185 to 212° F. for periods of from about 20 to 30 minutes is sufficient to effect their conversion.

The precise details of the above-described procedures for preparing these converting starches and their aqueous dispersons are not particularly critical and other procedures which incorporate minor variations may, of course, be used. For example, the modifying agent, instead of being mixed with the starch in dry form, may, if desired, be dissolved directly in the water which is subsequently to be used in preparing the starch dispersion, thereby eliminating the need for pre-blending the modifying agent with the dry starch.

The converting starches of the present invention are useful in the preparation of processed food systems in which application use is made of their ability to display a high viscosity upon their first being cooked whereupon their viscosity will be significantly reduced subsequent to their being more fully cooked or exposed to elevated temperatures. Among the food products which can profit from the presence of these starches are soups, meat sauces, tomato sauce, gravies, baby foods, puddings, fruit sauces and fruit drinks, etc.

In the commercial processing and canning of food products such, for example, as soups, gravies, meat sauces, and the like, it is desirable to employ a highly viscous liquid vehicle, usually a starch dispersion, in order to eliminate or reduce the splashing which occurs during the can filling operation as well as to aid in keeping the food solids in suspension. Such high viscosities are, however, undesirable in the finished food product which is to be used by the consumer. While conventional starches are often used as thickening agents in such processed food systems, they do not offer any solution to the problem of providing a vehicle which first exhibits the high viscosity that is desirable during the processing and canning operations but which is subsequently capable of exhibiting a substantially reduced viscosity so as to present a more appealing product to the ultimate consumer. In contrast to conventional starches, however, dispersions of the converting starches of this invention do possess such dual viscosity characteristics, and their use in the preparation of such food products permits the original thick or heavy viscosity of the liquid vehicle to be reduced merely by the retorting of the canned food product in the conventional manner that is employed to effect the sterilization of the food product.

These converting starches are typically incorporated into food products either by combining the converting starch dispersion directly with the food base ingredients prior to canning, or, by admixing the converting starch with the food base ingredients during the initial cooking. As an optional component, these converting starch slurries may also contain a conventional starch such, for example, as a crosslinked tapioca or waxy maize, which serves as a thickener. The resulting slurry, i.e. the homogeneous blend of food base ingredients together with the converting starch product, either with or without the conventional starch thickener present therein, will initially display a high viscosity and is thereupon poured into cans or other containers. The filled containers are subsequently retorted at temperatures of about 250° F. for a period of about 20–30 minutes, thereby causing the viscosity of the slurry to undergo a substantial decrease. In all cases, the starch-containing food products will have been placed into containers at a much higher viscosity level as compared to their final form subsequent to retorting.

The converting starches of the present invention are also useful in the manufacture of paper wherein they can be used either as beater box sizes or calender sizes. These converting starches are particularly useful in situations wherein high starch solids content together with a low viscosity on the part of the resultant size are desired. Thus, where sizes utilizing conventional starches are limited as to their starch solids content because of the resultant increased viscosity, sizes which incorporate the converting starch of this invention can contain a relatively higher concentration of starch solids while still maintaining a low viscosity.

It is to be noted that while all of the modifying agents employed herein are mono- or dicarboxylic acids, the mechanism involved in the degradation of the novel converting starches of this invention is not dependent upon a simple acid conversion or hydrolysis as is evidenced by the neutral and slightly basic pH levels at which these starches may be converted. Each of the modifying agents used herein displays an ene-diol structure, i.e.

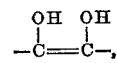

and it is believed, that it is the presence of this structure, surprisingly, which makes the conversion reaction possible. Thus, when a large number of related acids such, for example, as citric acid, lactic acid, gluconic acid, and 2-keto gluconic acid, none of which contained an ene-diol structure, were tested in order to determine their degradative action on starch, it was found that all of these acids were completely ineffective. The possibility that ascorbic acid which exists as a lactone was undergoing hydrolysis to free the acid group was likewise considered. Glucuronolactone was thereupon used in the test systems and also found to be without effect. It can be seen, therefore, that the conversions which take place with the converting starches of this invention do not result solely from the presence of carboxyl groups on the specified modifying agents.

It is also to be noted that while a particular converting starch of the present invention may comprise a mixture of a starch base with ascorbic acid wherein the major portion of the mixture will comprise the starch base, such a mixture is, of course, to be distinguished from the tableting formulations used for the preparation of ascorbic acid, i.e. vitamin C, tablets. In such latter tableting formulations, starch will be present in minor proportions relative to the ascorbic acid, and serves as a binder and/or disintegrating agent. Needless to say, such tableting formulations are entirely unrelated to the novel converting starch systems of the subject invention.

The embodiment of this invention is further illustrated by the following examples in which all parts given are by weight unless otherwise noted.

EXAMPLE I

This example illustrates the preparation of a typical converting starch of this invention as well as the viscosity characteristics of the aqueous dispersions derived therefrom.

A total of 996 parts of a waxy maize starch was thoroughly blended with 4 parts of finely divided ascorbic acid until the mixture was homogeneous. An aqueous dispersion of the thus prepared converting starch, comprising 6 parts of the starch-ascorbic acid mixture and 94 parts of water, was cooked for a period of 15 minutes at about 200° F., displaying an expected high viscosity, whereupon the dispersion was retorted at 250° F. for a period of 40 minutes. A control comprising an aqueous dispersion containing 6%, by weight, of the waxy maize starch which, in this case, was devoid of any ascorbic acid, was also prepared and cooked for a period of 15 minutes at about 200° F. and likewise displayed a comparable high viscosity. The dispersion was then retorted at 250° F. for a period of 40 minutes. Subsequent to the retorting period, each dispersion was cooled to about 167° F. and its viscosity was determined using a Brookfield RVF Viscometer employing a #2 spindle at 20 r.p.m. It was found that the dispersion of the converting starch had a viscosity of 77 cps. while the control had a viscosity of 280 cps. clearly indicating that only the converting starch of this invention had the ability to undergo a substantial reduction in its viscosity upon being subjected to high temperature conditions. In a repetition of the above procedure, dihydroxymaleic acid in a concentration of 0.4%, by weight, and araboascorbic acid in a concentration of 0.6%, by weight were each, in turn, used to prepare a converting starch product. Upon determining the viscosity of the aqueous dispersions derived from these converting starches by means of the above described procedure, it was found that the dispersion prepared with the converting starch containing the dihydroxymaleic acid had a viscosity of 115 cps. while the dispersion prepared with the converting starch containing the araboascorbic acid had a viscosity of only 74 cps.

Thus, it is seen that each of the converting starches of this invention yielded dispersions having a significantly lower viscosity as compared with the control which had been prepared using an identical starch which had not, however, been admixed with a modifying agent.

EXAMPLE II

This example illustrates the preparation of additional converting starches of this invention as well as the preparation of aqueous dispersions derived therefrom.

The procedure used in preparing these converting starches was identical to that described in Example I, hereinabove, except that corn starch was used in place of waxy maize starch. In this manner, converting starches were prepared using 0.6%, by weight, of ascorbic acid and dihydroxymaleic acid, respectively. An aqueous dispersion of each converting starch was prepared and these were compared with a control comprising an aqueous dispersion of the untreated corn starch; each of these dispersions having a starch solids concentration of 8%, by weight. The viscosity of each dispersion, after retorting, as determined at about 167° F. is given in Table I.

TABLE I

| Contents of dispersion: | Viscosity, cps. |
|---|---|
| Converting starch containing ascorbic acid | 488 |
| Converting starch containing dihydroxymaleic acid | 308 |
| Control containing untreated corn starch | 1450 |

The above results again illustrate the ability of the novel converting starches of this invention to undergo a substantial viscosity decrease upon being subjected to high temperature conditions.

EXAMPLE III

This example illustrates the preparation of converting starches based, respectively, on ether and ester derivatives of corn starch.

A total of 994 parts of corn starch which had been etherified by means of the procedure described in Example I of U.S. Pat. 2,813,093 so as to introduce diethyl aminoethyl substituent groups to the extent that its Kjeldahl nitrogen content was 0.25%, by weight, was blended with 6 parts of finely divided ascorbic acid. With another identical portion of this starch derivative, there was blended 6 parts of dihydroxymaleic acid. Aqueous dispersions having a starch solids concentration of 8%, by weight, were prepared from each of these converting starches. A control comprising a comparable aqueous dispersion of the identical starch derivative which had not, however, been treated with the modifying agent was also prepared. All of these dispersions were retorted at about 250° F. for a period of 40 minutes and then cooled to about 167° F. Viscosity measurements of each of the thus-prepared dispersions are summarized in Table II.

TABLE II

| Contents of the dispersion: | Viscosity, cps. |
|---|---|
| Converting starch containing ascorbic acid | 122 |
| Converting starch containing dihydroxymaleic acid | 80 |
| Control containing etherified starch | 219 |

The above results illustrate the substantial decrease in viscosity which the converting starches of this invention undergo when subjected to high temperature conditions.

In a repetition of the above-described procedure, the etherified corn starch used therein was replaced with corn starch which had been esterified by means of the procedure described in Example I of U.S. Pat. 2,461,139 so as to introduce acetate substituent groups onto the starch molecule. The degree of substitution of this starch acetate ester was 0.1. The viscosity of each of the thus prepared dispersions are summarized in Table III.

TABLE III

| Contents of the dispersion: | Viscosity, cps. |
|---|---|
| Converting starch containing ascorbic acid | 127 |
| Converting starch containing dihydroxymaleic acid | 77 |
| Control containing esterified starch | 2928 |

Thus, the above results again illustrate the substantial decrease in viscosity which the converting starches of this invention undergo when subjected to high temperature conditions.

EXAMPLE IV

This example illustrates the preparation of another converting starch which is typical of the products of this invention.

A total of 97 parts of a waxy maize starch was blended with 2.8 parts of ascorbic acid. An aqueous dispersion comprising 8 parts of the thus prepared converting starch and 92 parts of water were heated to 190° F. for a period of 5 minutes after which time the dispersion displayed a normal, high viscosity. The dispersion was thereupon retorted at 250° F. for a period of 35 minutes. After being cooled to a temperature of about 167° F. it was found to display a water-thin viscosity level.

EXAMPLE V

This example illustrates the use of the converting starch of this invention in preparing a dry, degraded product.

To a slurry comprising 200 pounds of a waxy corn starch and 200 gallons of water was added 2 pounds of dihydroxymaleic acid. The resulting slurry was heated at about 190° F. for a period of 20 minutes and then dried by means of a conventional drum drying procedure. The resulting dry product was ground to a suitable, conventional particle size. A control was run in identical manner omitting the dihydroxymaleic acid.

An aqueous dispersion comprising 8 parts of the thus converted starch product and 92 parts of water was warmed to a temperature of about 167° F. Its viscosity was found to be 575 cps. A control comprising a comparable prepared dispersion using a waxy corn starch which, however, had not been treated with the dihydroxymaleic acid, displayed a viscosity of 2,150 cps. when treated in the same manner.

EXAMPLE VI

This example illustrates the preparation of a chicken gravy containing one of the converting starches of this invention.

A total of 10 parts of an uncooked aqueous dispersion containing 6%, by weight, of a converting starch based on corn starch which had been admixed with 0.5%, by weight, of ascorbic acid was combined with 90 parts of semi-cooked chicken gravy. The homogeneous blend was thereupon heated at 195° F. for a period of 20 minutes and was subsequently cooled to 165° F. When the viscosity of the homogeneous starch-gravy blend was measured at this point by means of a Bostwick Viscometer, an instrument which measures viscosity in terms of distance flowed within a specified period of time, it was found that it flowed 19.5 centimeters in 1 minute, indicating that it had a rather high viscosity. The viscous gravy was poured into conventional #2 cans which were then sealed in the usual manner. The filled cans were then retorted at 250° F. at about 15 p.s.i. for a period of 30 minutes so as to thereby effect a substantial reduction in the viscosity of the blend. When the viscosity of the retorted product, after being cooled to 165° F., was measured by means of the Bostwick Viscometer, it was found that the material flowed 24 centimeters in 1.5 seconds, indicating that a substantial decrease in the viscosity of the chicken gravy had, in fact, occurred.

Summarizing, it is seen that this invention provides a means of obtaining a novel converting starch which is particularly characterized by the high and low viscosity levels of its aqueous dispersions.

Variations may be made in materials, proportions and procedures without departing from the scope of this invention.

I claim:

1. A starch-containing food product comprising a pressure-cooked homogeneous blend of food base ingredients together with a converting starch product comprising a starch which is intimately admixed with at least one modifying agent selected from the group consisting of ascorbic acid, araboascorbic acid and dihydroxymaleic acid; said modifying agent being present in said converting starch in a concentration of at least about 0.2%, based on the weight of the starch.

2. In the process of preparing starch-containing food products, the improvement which comprises the addition to food base ingredients of a converting starch product comprising a starch which is intimately admixed with at least one modifying agent selected from the group consisting of ascorbic acid, araboascorbic acid and dihydroxymaleic acid; said modifying agent being present in said converting starch in a concentration of at least about 0.2%, based on the weight of the starch, said starch-containing food product being cooked of pressure-cooked subsequent to the admixture of said converting starch.

3. The process of claim 2, wherein subsequent to the admixture of said converting starch with said food base ingredients, said starch-containing food product is pressure-cooked to a temperature of from about 220 to 350° F. for a period of from about 1 to 45 minutes.

4. The process of claim 2, wherein said modifying agent is dihydroxymaleic acid and subsequent to the admixture of said converting starch with said food base ingredients, said starch-containing food product is cooked at a temperature of from about 185 to 212° F. for a period of at least 20 minutes.

5. In the process of preparing starch-containing food products, the improvement which comprises the addition to food base ingredients and intimately admixing therewith a starch and at least one modifying agent selected from the group consisting of ascorbic acid, araboascorbic acid and dihydroxymaleic acid; said modifying agent being present in a concentration of at least about 0.2%, based on the weight of the starch, said starch-containing food product being cooked or pressure-cooked subsequent to the admixture of said starch and modifying agent.

6. A starch-containing food product comprising a cooked or pressure-cooked homogeneous blend of food base ingredients, a starch and at least one modifying agent selected from the group consisting of ascorbic acid, araboascorbic acid and dihydroxymaleic acid; said modifying agent being present in a concentration of at least about 0.2%, based on the weight of the starch.

References Cited

UNITED STATES PATENTS

| | | | |
|---|---|---|---|
| 2,660,577 | 11/1953 | Kerr | 99—139 X |
| 2,818,343 | 12/1957 | Toulmin | 99—139 |
| 2,938,799 | 5/1960 | Toulmin | 99—139 |
| 3,021,222 | 2/1962 | Kerr | 99—144 X |
| 3,332,785 | 7/1967 | Kuchinke | 99—139 |
| 3,553,195 | 1/1971 | Jarowenko | 99—144 X |
| 3,582,350 | 6/1971 | Werbin | 99—139 X |
| 3,369,910 | 2/1968 | Ganz | 99—144 X |

OTHER REFERENCES

Chemical Abstracts, 58: P8359h (1963).
Chemical Abstracts, 65: P17609g (1966).

MORRIS O. WOLK, Primary Examiner

S. MARANTZ, Assistant Examiner

U.S. Cl. X.R.
99—1, 105, 124; 127—29, 33, 38, 70; 106—213